United States Patent [19]

Wijts

[11] Patent Number: 5,059,392
[45] Date of Patent: Oct. 22, 1991

[54] BATCH STERILIZING SYSTEM

[75] Inventor: Corneel C. Wijts, Saratoga, Calif.

[73] Assignee: FMC Corporation, Chicago, Ill.

[21] Appl. No.: 346,443

[22] Filed: Apr. 24, 1989

[51] Int. Cl.$^5$ .................. A61L 2/00; B65B 55/02
[52] U.S. Cl. ..................... 422/32; 422/297;
422/302; 422/307; 414/222; 414/279; 426/407;
99/468; 99/470
[58] Field of Search ............ 422/25, 26, 38, 119,
422/302, 304, 295, 297, 307, 32; 99/361, 468,
470, 477; 414/222, 279, 217, 277; 198/435;
426/407

[56] References Cited

U.S. PATENT DOCUMENTS

| 3,286,619 | 11/1966 | Lee | 422/304 |
|---|---|---|---|
| 3,776,257 | 12/1973 | Piegza | 137/206 |
| 3,972,679 | 8/1976 | Ruig | 422/304 |
| 3,986,832 | 10/1976 | Smorenburg | 422/304 |
| 4,164,590 | 8/1979 | Mencacci | 426/407 |
| 4,196,225 | 4/1980 | Mencacci | 426/523 |
| 4,417,838 | 11/1983 | Schultz et al. | 414/277 |
| 4,505,630 | 3/1985 | Kascher et al. | 414/279 |
| 4,525,978 | 7/1985 | Hayase et al. | 422/302 |
| 4,646,629 | 3/1987 | Creed et al. | 99/468 |
| 4,661,325 | 4/1987 | Noro et al. | 422/304 |
| 4,666,722 | 5/1987 | Creed et al. | 99/470 |
| 4,773,321 | 9/1988 | Wijts | 99/361 |
| 4,773,807 | 9/1988 | Kroll et al. | 414/279 |

FOREIGN PATENT DOCUMENTS

| 673812 | 11/1963 | Canada | 422/55 |
|---|---|---|---|
| 0075531-A3 | 3/1983 | European Pat. Off. | |

Primary Examiner—Robert J. Warden
Assistant Examiner—Theresa A. Trembley
Attorney, Agent, or Firm—A. J. Moore; R. C. Kamp; R. B. Megley

[57] ABSTRACT

A batch sterilization system is disclosed for first loading containers to be sterilized into cars, transferring the loaded cars into one of a plurality of retorts arranged in horizontal rows and vertical columns, sterilizing the containers while in the retorts and discharging the containers from the cars, discharging the cars from the retort, unloading the cars and thereafter repeating the cycle. The system includes a plurality of single or double door retorts in horizontal and vertical rows thereby minimizing floor spaced. Different horizontally and vertically spaced retorts may process products requiring different sterilization times in the retorts. A programmable computer is preferably used for performing the several functions of the sterilization system and for keeping track of the location of the containers during and after processing. A second embodiment of the invention includes first and second double door retorts and first and second elevators with the unloader being positioned close to the second elevator.

21 Claims, 4 Drawing Sheets

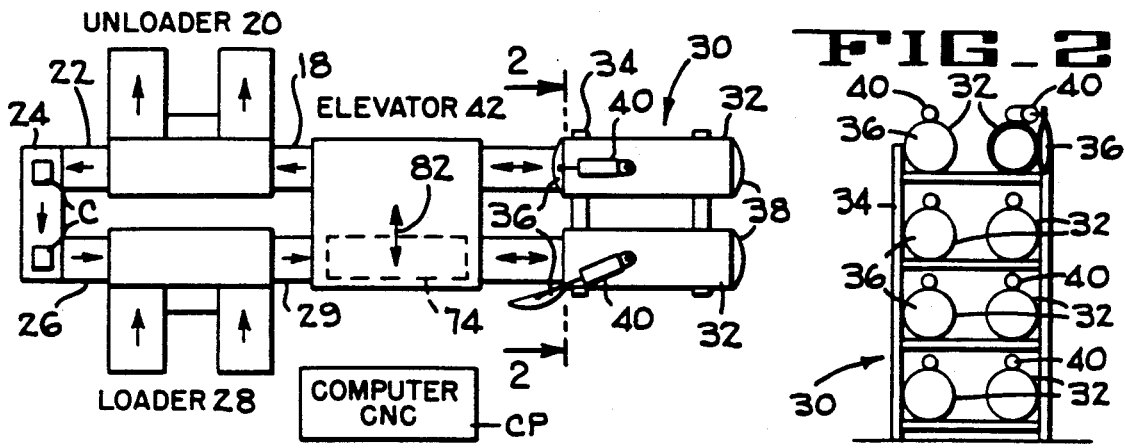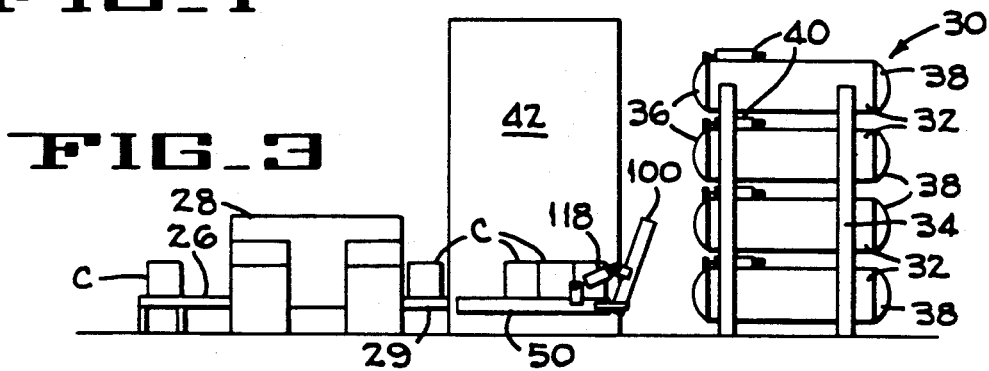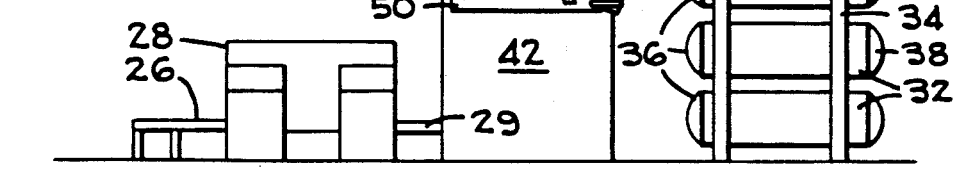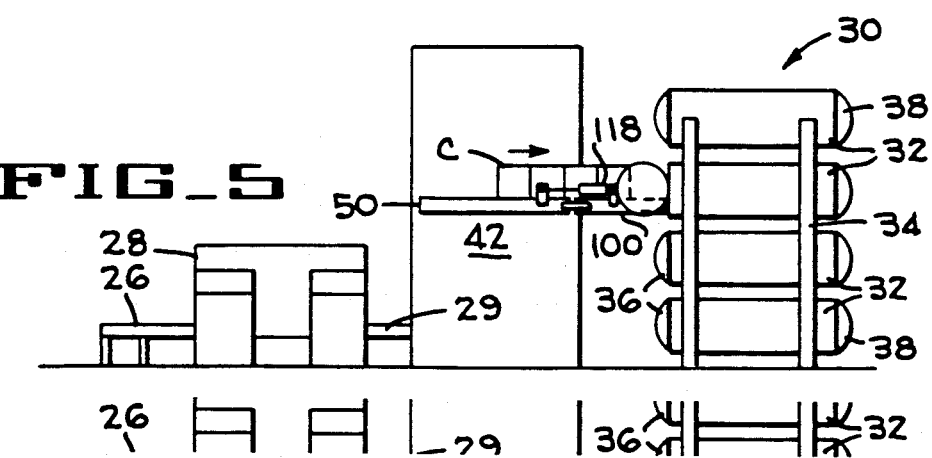

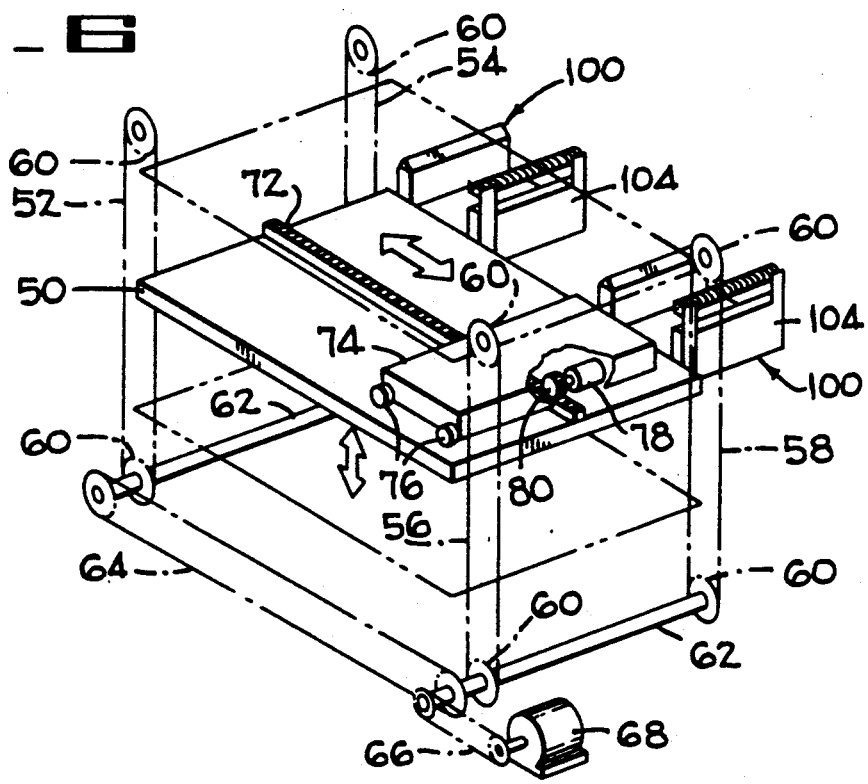
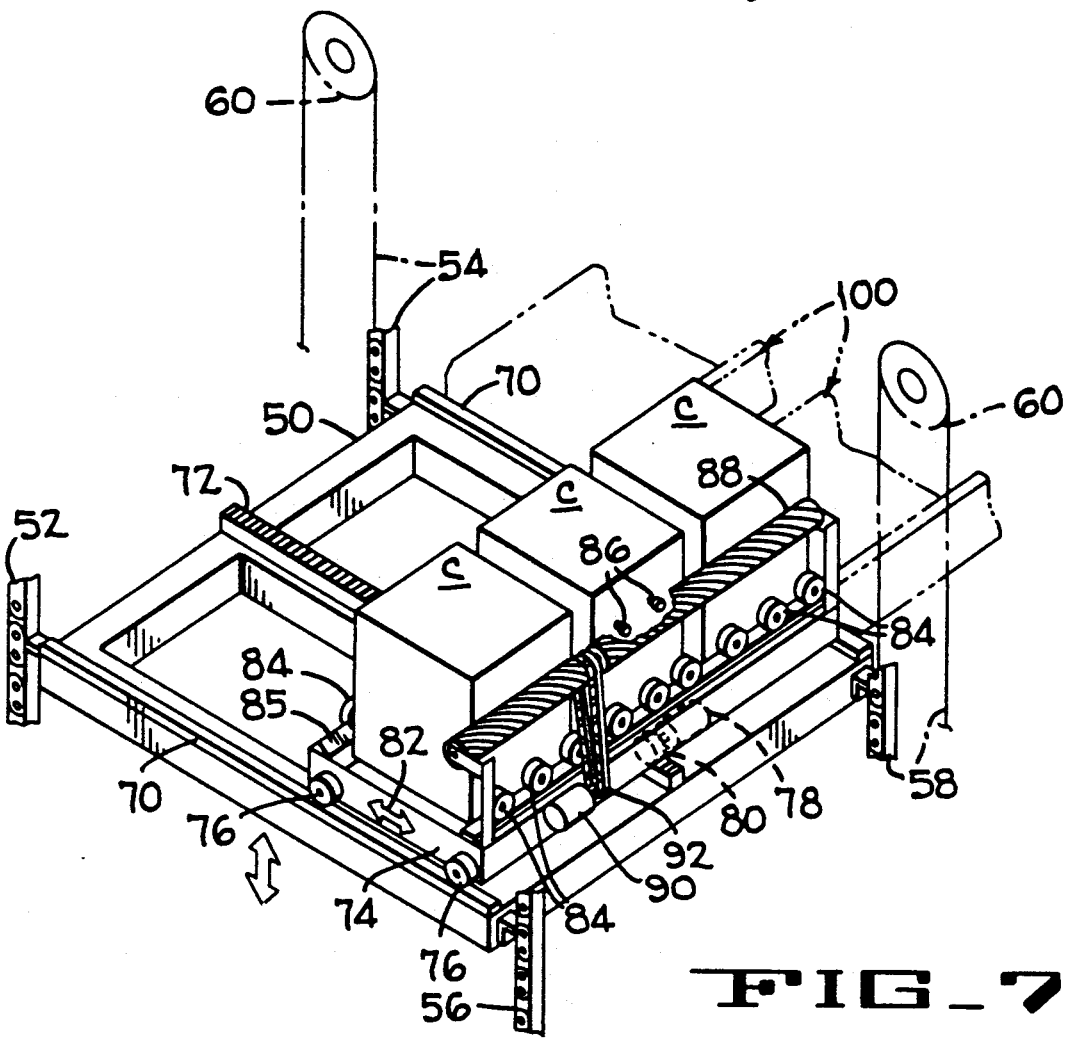

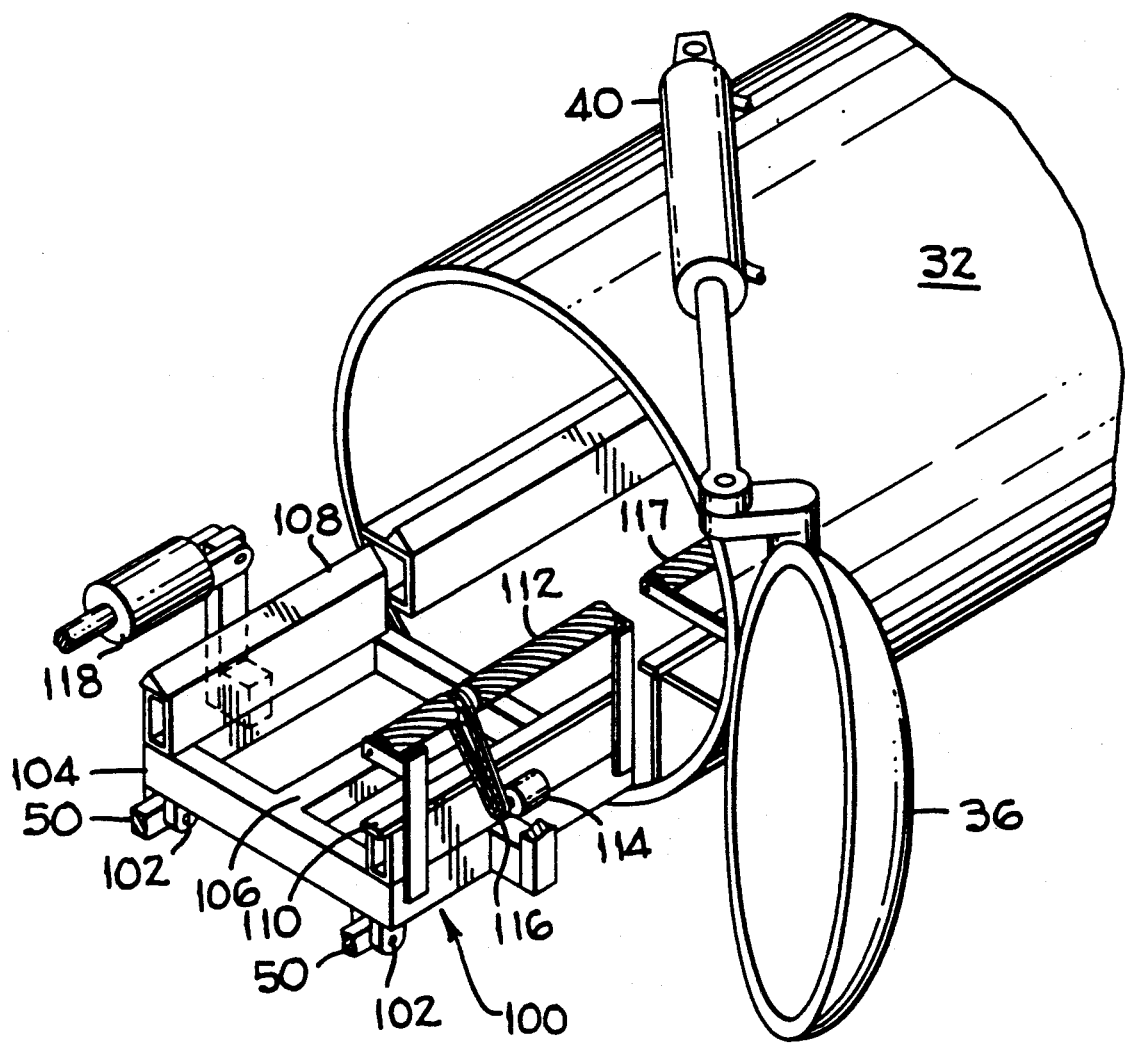

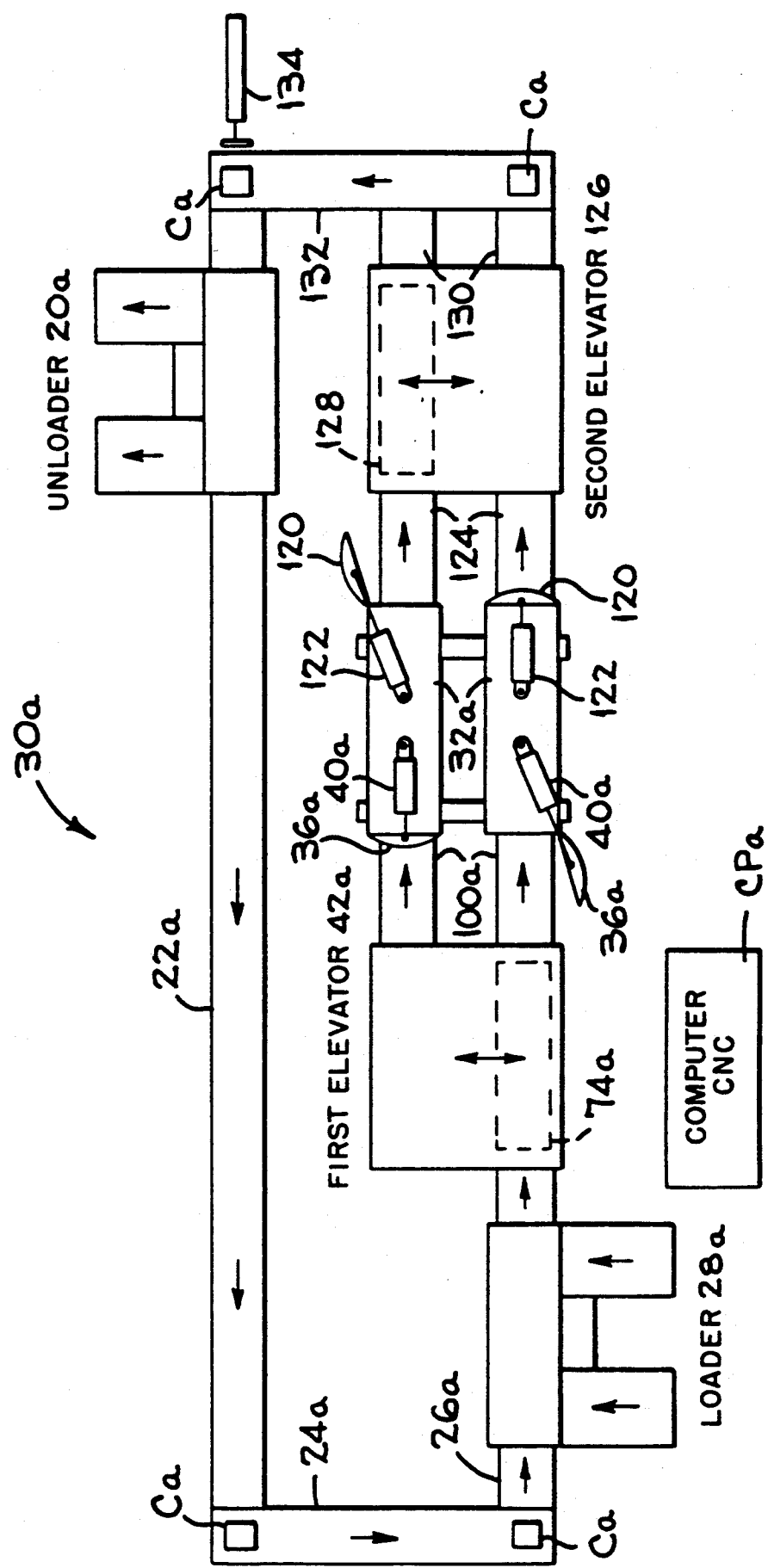
FIG_9

BATCH STERILIZING SYSTEM

BACKGROUND OF THE INVENTION

1. Field of the Invention

The present invention pertains to sterilizer systems and more particularly relates to a plurality of horizontal and/or vertically spaced batch type retorts with a conveying system for selectively moving groups of containers within at least one car into the sterilizers.

2. Description of the Prior Art

Batch type sterilizers or retorts such as that disclosed in Mencacci U.S. Pat. No. 4,164,590 are well known in the art and are adapted to receive and discharge a plurality of containers within supporting cars through a door at one end of each retort. It will also be understood that doors may be provided on both ends of the retorts if desired.

A continuous pressure cooker and cooler is disclosed in Mencacci U.S. Pat. No. 4,196,225 and illustrates container filled cars or carts which are moved from one end to the other end of a continuous cooker and cooler while cooking and thereafter cooling containers being processed.

Commercially available batch type of sterilizers such as FMC Model CFS are also used for sterilizing food products in cans, jars, pouches, plastic trays and other product filled containers.

European Patent Application Publication No. 0075531 discloses a sterilizing system which includes means for filling and sealing articles in containers, loading trays with the sealed articles therein into stacks, and then conveying the stacks through a sterilizer and thereafter removing the sterilized containers with the aid of a conveying system.

Conventional container receiving cars, loaders, unloaders, and car conveying means are disclosed in Creed et al U.S. Pat. No. 4,646,629.

Piegza U.S. Patent No. 3,776,257 discloses the use of water as the heating medium in retorts and the use of power means for opening and closing retort doors.

When a demand for more containers to be sterilized increases, more container supporting cars and more sterilizing units or retorts are required. Usually the containers are loaded and unloaded into the cars automatically, with conventional loader/unloader devices. At the present time cars are usually transported between these loaders/unloaders and the retorts by fork lifts or automatically guided vehicles. As the prior art sterilizing systems become bigger, this transport function becomes quite complex and labor intensive. It also becomes difficult to keep track of sterilized and unsterilized containers in the plurality of cars after they have been removed from present prior art systems.

SUMMARY OF THE INVENTION

In order to conserve floor space, the retorts may be supported in a plurality of levels with a plurality of retorts in each level. One or more vertically and horizontally movable carriers, and one or more adjustable bridges are provided to move one or more container filled cars into selected ones of said retorts and to move the cars and sterilized containers from the retorts onto a conveying system. The loaders move containers or other articles to be sterilized into empty cars, and the unloaders remove the sterilized containers or articles from the cars.

DESCRIPTION OF THE DRAWINGS

FIG. 1 is a diagrammatic plan of the batch sterilizer system of the present invention illustrating a vertical sterilizer.

FIG. 2 is a section taken along lines 2—2 of FIG. 1, rotated 90°, illustrating a plurality of horizontally and vertically spaced retorts with one retort door in the fourth level being opened.

FIG. 3 is a diagrammatic operational view in elevation of the batch sterilizing system of FIG. 1 illustrating a carrier having three cars thereon in a lowermost position and further illustrating a bridge in a raised inoperative position.

FIG. 4 is a diagrammatic elevation similar to FIG. 3 but illustrating the carrier fully loaded with cars at the elevation of a higher retort to be loaded.

FIG. 5 is an operational view similar to FIG. 4 except that the cars filled with containers to be sterilized are shown being conveyed over the bridge into an open retort.

FIG. 6 is a diagrammatic perspective of an elevator, an elevator frame supporting a transversely movable carrier, and a pair of bridges in loading position.

FIG. 7 is an enlarged diagrammatic perspective of the elevator and carrier illustrating drive means in position to load a batch of cars into a retort.

FIG. 8 is a diagrammatic perspective illustrating a drive system for driving the cars onto one of a plurality of bridges into and out of the retort.

FIG. 9 is a diagrammatic plan of a second embodiment of the invention illustrating double door vertically and horizontally spaced retorts for receiving containers through one door and discharging processed containers out of the other door.

DESCRIPTION OF THE PREFERRED EMBODIMENT

A batch sterilization system of the present invention is diagrammatically illustrated in FIGS. 1–8. Cars C which are received from a conveyor 18 and a conventional unloader 20, are conveyed by conventional conveyors 22, 24 and 26 into conventional loader 28 which loads containers to be processed into the cars C and discharges the cars onto a conveyor 29.

The batch sterilization system is in the form of a vertical sterilizing system 30 (FIGS. 1–5) which is controlled by a computer CP (FIG. 1) or programmable controller with the aid of conventional sensors and other controls. The new features of the vertical sterilizer system includes a plurality of retorts 32 mounted on a frame 34 in vertical rows and horizontal columns, only two vertical columns and four horizontal rows being illustrated. Each retort includes a door 36 pivoted to one end and has its other end sealed by an end closure 38. The doors 36 are opened and closed by power means such as hydraulic cylinders 40 as is conventional in the art. A generally rectangular elevator housing 42 has a lower rectangular opening (not shown) in a front wall and a rear opening (not shown) that are large enough to allow retort cars C to enter the housing 42 at a predetermined elevation, preferably at a low elevation; and to be discharged through a large rear opening (not shown) to permit the cars to be moved into any one of the retorts.

As best shown in FIGS. 6 and 7, a generally rectangular vertically movable elevator frame 50 within the housing 42 is connected to four endless chains 52, 54, 56, and 58, with the lower ends of the chain trained around sprockets 60 keyed to shafts 62 (only two being shown). A chain drive 64 interconnects the two lower shafts 62, and a second chain drive 66 connects one of said lower shafts to a reversible elevator motor 68 thereby raising or lowering the elevator frame 50 to desired elevations.

As shown in FIG. 7, the rectangular elevator frame 50 has a pair of tracks 70 and an intermediate rack 72 extending transversely thereof. A transversely movable carrier 74 is supported by two pair of freely rotatable wheels 76 (only two wheels being shown in FIG. 7) which wheels ride on the tracks 70. A reversible motor 78 is secured to the carrier 74 and has a pinion 80 on its drive shaft which meshes with the teeth of the rack 72 thereby selectively moving the carrier 74 transversely into alignment with the selected vertical rows of retorts 32 as indicated by the double headed arrow 82 (FIGS. 1 and 7). As best shown in FIG. 7, each car C is preferably supported on freely rotatable wheels 84 with one pair of wheels 84 being adapted to ride on V-shaped tracks 85. Each car C has a plurality of pins 86 (FIG. 7) projecting outwardly from both side walls of the car in a direction parallel to the axis of the wheels 84. The cars C are transferred onto the carrier 74 and are moved off the carrier by means of an elongated screw 88. The screw is journaled on the carrier 74 and is driven by a motor 90 and chain drive 92. The above type of screw drives are old in the art and are similar to those described in Creed et al U.S. Pat. No. 4,646,629.

It will be understood that similar screw drives are provided within the several retorts 32 and along the several conveyors to be described hereinafter.

A plurality of bridges 100 (only two being shown in FIGS. 7 and 8) are aligned with the vertical rows of retorts 32 and are pivotally mounted on the rectangular elevator frame 50 (FIG. 8) by a pair of hinges 102. Each bridge includes a rectangular frame 104 having a central rib 106, a V-shaped track 108 and a flat track 110 for movably supporting the cars C. A helical screw 112 is rotatably supported on the bridge 100 and is driven by a reversible motor 114 connected thereto by a chain drive 116 for driving the cars into or out of the retorts 32. A helical screw 117 within the retort is driven by means (not shown) and cooperates with the screw 112 to move the cars into or out of the retorts 32. The bridge 100 is pivoted between an upwardly inclined inoperative position illustrated in FIGS. 3 and 4, and an operative position illustrated in FIGS. 5-8 by power means such as a hydraulic cylinder 118 pivotally connected between the bridge 100 and the elevator frame 50.

In operation of the batch sterilization system 30 of the first embodiment of the invention, empty cars C (FIG. 1) are received from the unloader 20 which has unloaded a previously sterilized batch of containers from loaded cars C. The empty cars are then conveyed by conveyors 22, 24 and 26 into the loader 28 which loads containers to be processed into cars C. The loaded cars are then moved by conveyor 29 and the elongated screw 88 (FIG. 7) into the elevator housing 42 and onto the transversely movable carriers 74 (FIGS. 6 and 7). Appropriate sensors and controls (not shown) are responsive to the controllable computer CP (FIG. 1) which determines which retort of a plurality of retorts is empty and has its door 36 (FIG. 8) open, or is waiting to be opened, in response to the computer actuating the appropriate hydraulic cylinder 40. Simultaneously or sequentially therewith, the computer CP will send signals to elevator motor 68 which will raise the elevator frame 50 and carrier 74 to the elevation of the retort 32 to be loaded, and will activate motor 78 (FIG. 7) which drives the carrier 74 transversely to a position in alignment with the open retort. After the carrier 74 has been moved into position to move the car C thereon into the open retort 32, the computer actuates a hydraulic cylinders 118 (FIG. 8) which lowers the associated bridge 100 that is in alignment with the retort 32 to be loaded. The motor 114 then drives the screw 112 by means of the chain drive 116, and a similar motor (not shown) is connected to an elongated screw 117 within the retort 32 for advancing the cars fully into the selected retort. The screws 112 and 117 are activated by the computer CP (FIG. 1) for moving a plurality of loaded cars C fully into the selected retort 32.

Thereafter the computer CP controls the raising of the bridge 100 by actuating cylinder 118 and thereafter closing the retort door 36 by actuating the hydraulic cylinder 40. The elevator frame 50 and components supported thereon may then be lowered by actuating motor 68 (FIG. 6) in the frame lowering direction to pick up another plurality of filled cars C for insertion into another empty retort 32 as described above. Alternately, the elevator frame 50 may be raised or lowered and the carrier 74 may be moved transversely to pick up a sterilized batch of container filled cars C. The sterilized cars are then transferred over the bridge when lowered onto the carrier 74 and thereafter be lowered to the level of the conveyor 18 (FIG. 1). The carrier motor 78 would then be activated by sensors and the computer CP to move the carrier 74 to the left (FIG. 7) into alignment with the conveyor 18 (FIG. 1) and unloader 20 which empties the cars and transfers the empty cars onto the conveyors 22, 24 and 26 to again be loaded with containers (not shown) to be sterilized. Although not fully illustrated in the drawings it will be understood that the preferred drive system for moving the cars C (FIG. 1) between the retorts 32, the loader 28 and unloader 20 are generally of the type illustrated in Assignee's Creed et al U.S. Pat. No. 4,646,629 which issued on Mar. 3, 1987. However, it will be understood that other drive systems may be used. Also, it will be understood that the system within the several retorts for heating and thereafter cooling the containers may be of any well known type used in retorts which raise the temperature of the product within the containers in the cars to the sterilizing temperature, maintain the temperature a sufficient length of time until the product within the sterilizer is sterilized, and thereafter cool the product to reduce the pressure within the containers to a pressure below atmospheric pressure before opening the door 36 of the associated retort 32.

The batch sterilization system of the present invention is preferably under the control of a computer or programmable controller and a plurality of sensors. The control system will allow for independent control of each retort thereby enabling the several retorts to handle different products under different sterilizing pressures, temperatures and time.

A modification of the batch sterilization system 30a is illustrated in FIG. 9. Components of the system 30a which are equivalent to those of the first embodiment will be assigned the same numerals followed by the letter "a".

The system 30a comprises an unloader 20a which directs empty cars Ca onto conveyors 22a, 24a and 26a into a loader 28a which loads a new batch of product filled containers to be processed into cars Ca. The loader 28a moves the cars Ca onto a carrier 74a of a first elevator 42a which is vertically and transversely movable for moving one or more cars over a bridge 100a into horizontal and vertical alignment with a selected retort 32a. Each retort includes an inlet door 36a operated by a power means such as a hydraulic cylinder 40a and an outlet door 120 operated by a second power means 122. When the bridge 100a is lowered into transport position as shown in FIG. 9 and the inlet door 36a is opened, one or more container filled cars are moved into the retort and the door 36a is closed. With both doors 36a and 120 closed, a sterilizing medium is directed into the selected retort to sterilize the product being processed; and thereafter the product is cooled by a cooling medium such as cold water. The outlet door 120 is then opened and the car or cars Ca with processed products therein are conveyed over an outlet bridge 124 of a second elevator 126 and onto a second transversely and vertically movable carrier 128. The carrier 128 is then moved to the level of one of a plurality of discharge conveyors 130 (only two being shown) which transfers the cars with processed containers therein onto a cross conveyor 132. A hydraulic pusher 134 then pushes the car into the unloader 20a which unloads containers (not shown) with processed products therein from the cars Ca and moves the cars onto the conveyor 22a thereby completing a cycle of operation. All of the above described components are preferably controlled by a computer CPa.

It will be noted that the modified batch sterilization system 30a (FIG. 9) positions the unloader 20a closely adjacent to the discharge of the second elevator 126 thereby unloading the cars Ca as soon as possible so that empty cars can be returned to the loader 28a thus saving considerable energy.

In case of mechanical, electrical, or hydraulic problems or the like in one or more retorts, the control systems preferably will also allow bypassing of the defective retorts to allow continued operation of the other retorts while the defective retorts or controls are being repaired.

From the foregoing description it will be apparent that a batch sterilizer system has been disclosed. The system uses conventional loaders and unloaders and conveying systems for selectively loading and unloading a plurality of retorts, each of which are under the control of a computer or programmable controller, thereby enabling a plurality of cars to be loaded with containers, to be moved into selected ones of the retorts for sterilization and subsequent discharge from the several retorts. When the system is used to handle more than one type of product to be sterilized, batches of containers having a first type of product therein would be loaded into a first batch of cars and first groups of retorts; and other products would be loaded into a second batch of cars and second group of retorts. The computer would be programed to provide the desired sterilizing and cooling times for the particular product in each group of retorts. A plurality of vertical rows and a plurality of horizontal rows of retorts in excess of that illustrated in the drawings would be used when sterilizing large volumes of containers.

Although the best mode contemplated for carrying out the present invention has been herein shown and described, it will be apparent that modification and variation may be made without departing from what is regarded to be the subject matter of the invention.

What is claimed is:

1. A method for sterilizing products in containers, comprising the steps of:
   actuating a loader for loading containers into at least one car;
   selectively elevating and translating said at least one loaded car into a selected empty retort;
   transferring said at least one car into a selected one of a plurality of retorts, each having a door, said plurality of retorts being arranged in horizontal rows and vertical columns;
   closing the door of said selected retort;
   sterilizing and thereafter cooling the product in said at least one car while in said one retort;
   releasing the sterilized and cooled containers from said selected retort and removing said sterilized and cooled containers from said selected retort;
   unloading the sterilized and cooled containers from said at least one car;
   conveying the empty car into a loader for loading other containers to be sterilized into said at least one car; and
   repeating the above steps for sterilizing products and other cars and in other ones of said retorts.

2. A method according to claim 1 wherein all products in the conainers and cars loaded into one retort require the same time and temperature for sterilization and cooling the contents of the containers.

3. A method according to claim 1 wherein the products in the containers and cars loaded into one or more first retorts require the same time and the same temperature for sterilization and cooling, and wherein the products in the containers and cars that are loaded into one or more second retorts may require processing times and temperatures which differ from that of said one or more first retorts.

4. An apparatus for sterilizing products in containers, comprising:
   means for activating a loader for loading containers into at least one car;
   means for selectively elevating and translating said at least one loaded car into a selected empty retort;
   means for translating said at least one car into a selected one of a plurality of retorts each having a door, said plurality of retorts being arranged in horizontal rows and vertical columns;
   means for closing the door of said selected retort;
   means for sterilizing and thereafter cooling the product in said at least one car while in said one retort;
   means for releasing the sterilized and cooled containers from said selected retort and removing said sterilized and cooled containers from said selected retort;
   means for unloading the sterilized and cooled containers from said at least one car; and
   means for conveying the empty car into a loader for loading other containers to be sterilized into said at least one car.

5. An apparatus according to claim 4 wherein the products in the containers and cars loaded into one or more first retorts require the same time and the same temperature for sterilization and cooling the product in the containers, and wherein the product in the containers and cars loaded into one or more second retorts may require processing times and temperatures which differ from that of said one or more first retorts.

6. A vertical batch sterilization system for sterilizing products when in movable cars, comprising:

a plurality of horizontally and vertically spaced rows of retorts each having a door;

elevator means spaced from said retorts for supporting at least one loaded car and selectively elevating said at least one loaded car to the elevation of any one of said retorts;

carrier means on said elevator means for receiving said at least one loaded car and being selectively movable horizontally relative to said elevator means into a selective plurality of transverse positions in alignment with selective ones of said retorts;

a plurality of bridge means pivotally supported on said elevator means and movable between a horizontal operative position for transferring said at least one loaded car into and out of the selected ones of said retorts that are in alignment with said carriers; and independently controlled conveying means on said elevator means, said carrier means, and said bridge means for moving said at least one loaded car into and out of any one of said retorts 7. An apparatus according to claim 6 and additionally comprising power means for closing the door of the retort after being loaded, and opening said door after the product in the retort has been sterilized and cooled below the boiling point of water at atmospheric pressure.

8. An apparatus according to claim 7 wherein said elevating means, said carrier means, and said bridge means are activated in timed relation with said door means to remove processed containers from said retort.

9. An apparatus according to claim 6 wherein said elevating means, said carrier means, said bridge means, said door means and said independently controlling means may be actuated to load and unload containers from one retort while other retorts are processing containers therein 10. An apparatus according to claim 6 and additionally comprising a computer and sensors for controlling the operation of said vertical batch sterilization system.

11. An apparatus according to claim 9 and additionally comprising a computer and sensors for controlling the operation of said vertical batch sterilization system.

12. An apparatus according to claim 7 and additionally comprising:

loader means for loading unprocessed containers to be processed into said cars;

a feed conveyor for feeding the cars with unprocessed containers therein onto said carrier means;

an unloader means for unloading cars with processed containers therein; and a discharge conveyor for receiving the unloaded cars and conveying the empty cars into said loader means.

13. An apparatus according to claim 12 and additionally comprising a computer and controlling the operating of said vertical sterilization system.

14. In a batch sterilization system for sterilizing product filled containers in movable cars, the improvement which comprises:

means defining a plurality of vertical columns and horizontal rows of retorts, each retort having at least one door therein;

elevator means disposed adjacent said plurality of vertical columns in horizontal rows of retorts;

carrier means supported by said elevator means and capable of being selectively movable horizontally and vertically into alignment with each retort in each vertical column and horizontal row of retorts;

car conveying means on said carrier means for selectively moving said movable cars toward and away from said associated retorts when aligned with said retorts;

bridge conveyor means operatively connected to said elevator means for movement between an inoperative inclined position and an operative horizontal transfer position in alignment with a selected retort;

drive means on said bridge conveying means for moving containers into and out of a selective retort aligned therewith; and computerized control means for controlling the movement in timed relation with said retort doors, said elevator means, said carrier means, said car conveying means, said bridge conveying means, and said drive means on said bridge conveying means.

15. A batch sterilization method comprising the steps of:

loading product filled containers into cars at a loading station;

selectively elevating and translating said loaded cars into positions to be loaded into selected ones of said cars;

moving the filled cars into selected ones of a plurality of spaced retorts each having at least one door on each retort, said plurality of retorts being arranged in horizontal rows in vertical columns;

closing said at least one door on each retort for pressure sealing said one retort;

directing a heat treatment medium under pressure into said retort for sterilizing the product within the container;

directing a cooling medium into said retort for cooling the product and reducing the pressure within the retort below atmospheric pressure;

opening the door on said selected one of said retorts;

conveying the cars containing the sterilized containers a distance to an unloader;

unloading the sterilized containers from the car;

moving the empty cars a distance greater than that to the unloader to the loading station for minimizing power requirements; and controlling the steps of the batch sterilization method in timed relationship by computer means, sensor means and control means.

16. In a vertical batch sterilization system for sterilizing products in containers when in movable cars, comprising the steps of:

providing a plurality of horizontal and vertically spaced rows of retorts, each having a door;

selectively elevating at least one car to the elevation of any one of said retorts;

selectively moving said at least one car horizontally into alignment with any one of said retorts;

transferring said at least one car into said selected one of said retorts when said door is open;

closing said door of said selected retort;

sterilizing the products in said containers by directing a heat treatment medium into said retort;

cooling the product by directing a cooling medium against said containers for cooling said containers below atmospheric pressure;

opening said door;

discharging said at least one car and sterilized containers from the retort; and lowering said at least one car to the level of the lowest horizontally spaced rows of retorts.

17. A vertical batch sterilization system for sterilizing products in filled containers when in movable cars comprising;

loader means for loading the containers in the cars;

unloading means for unloading processed containers from said cars after the product in the containers have been sterilized;

elevator means for receiving at least one loaded car from said loader means and selectively elevating the at least one car to a plurality of different elevations;

carrier means on said elevator means for receiving said at least one loaded car and being horizontally and vertically movable into a plurality of positions transversely of said elevator means;

a plurality of horizontally and vertically spaced rows of retorts, each having a door, and each retort being in alignment with one of said plurality of positions;

a plurality of bridges pivotally supported on said elevator means and movable between a horizontal operative position for transferring said at least one loaded car into and out of said retort when in alignment with one of said plurality of carrier means positions; and means defining a plurality of independently controlled car conveying means for sequentially moving said at least one loaded car from said loader means onto said carrier means for vertically and transversely moving said at least one loaded car into alignment with a selected retort, opening said retort door, lowering said associated bridge, actuating car conveying means on said carrier means and said bridge means, and within the retort for driving said at least one container into said retort; thereafter closing said door and after sterilization and cooling of the contents of the containers has been completed reversing actuation of said independently driven car conveying means for moving said at least one car with processed containers therein into position to unload the processed containers and transfer the empty cars into the loader means.

18. A method for sterilizing products in containers, comprising the steps of:

actuating a loader for loading containers into at least one car;

transferring said at least one car into any one of a plurality of retorts, each having an inlet door and an outlet door, said plurality of retorts being arranged in horizontal rows and vertical columns;

sterilizing and thereafter cooling the product in said at least one car while in said retort;

opening said outlet door for releasing the sterilized and cooled containers from said one retort;

unloading the sterilized containers from said at least one car at a location near said outlet door thus reducing the weight of said empty car;

conveying said at least one reduced weight empty car into a loader remote from said unloader for loading other containers to be sterilized into said at lest one empty car thereby conserving energy due to said car being emptied a substantial distance before entering said loader; and repeating the above steps for sterilizing products and other cars and in other ones of said retorts.

19. A method according to claim 18 wherein the product in the containers and cars loaded into one or more first retorts require the same time and the same temperature for sterilization and cooling, and wherein different products in other containers and cars are loaded into one or more second retorts which require processing times and temperatures which differ from that of said one or more first retorts.

20. An apparatus for sterilizing products in containers comprising:

means for activating a loader for loading containers into at least one car;

means for transferring said at least one car into one of a plurality of retorts each having an inlet door and an outlet door, said plurality of retorts being arranged in horizontal rows and vertical columns;

means for sterilizing and thereafter cooling the product in said at least one car while in said retort;

means for opening said outlet door for releasing said at least one car and sterilized and cooled containers from said one retort;

unloader means for unloading the sterilized containers from said at least one car at a location near said outlet door thus reducing the weight of said empty car; and means for conveying said reduced weight empty car at least twice said first distance into a loader remote from said unloader means for loading other containers to be sterilized into said at least one car and for conserving energy.

21. An apparatus according to claim 20 wherein a first product in the containers and cars loaded into one or more first retorts require the same time and the same temperature for sterilizing the first product, and require the same time and cooling temperature for cooling the product in the containers; and wherein the product in the containers and cars loaded into one or more second retorts may require processing times and temperatures which differ from that of said one or more first retorts.

* * * * *